United States Patent [19]
Qi

[11] Patent Number: 5,426,348
[45] Date of Patent: Jun. 20, 1995

[54] HIGH EFFICIENCY BALLAST FOR OPERATION OF ELECTRONIC LAMPS

[75] Inventor: Wang J. Qi, Wuhan, China

[73] Assignee: Wattsmart, Inc., Dahlonega, Ga.

[21] Appl. No.: 230,390

[22] Filed: Apr. 20, 1994

[51] Int. Cl.6 .......................................... H05B 37/02
[52] U.S. Cl. ............................ 315/209 R; 315/307;
315/291; 315/DIG. 7
[58] Field of Search ............... 315/307, 308, 209 R,
315/291, 194, DIG. 7

[56] References Cited

U.S. PATENT DOCUMENTS

| | | | |
|---|---|---|---|
| 4,277,728 | 7/1981 | Stevens | 315/307 |
| 4,525,650 | 6/1985 | Hicks et al. | 315/226 |
| 5,138,235 | 8/1992 | Sun et al. | 315/209 R |
| 5,258,692 | 11/1993 | Jones | 315/247 |
| 5,262,699 | 11/1993 | Sun et al. | 315/209 R |

*Primary Examiner*—Robert J. Pascal
*Assistant Examiner*—Reginald A. Ratliff
*Attorney, Agent, or Firm*—Jones & Askew

[57] ABSTRACT

The present invention provides an apparatus for operating an electronic lamp from an AC line (10) and has a rectifier circuit (12), a power coupling circuit (18), a starting circuit (22), a resonant circuit (24), a feedback circuit (26), a driving circuit (28), and an output coupling circuit (30). The rectifier circuit (12) is connected to the AC line (10) and has a positive output terminal (14) and a negative output terminal (16) for providing DC operating power. The power coupling circuit (18) is connected to the DC operating power and provides power to a drive node (20). The starting circuit (22) provides a starting pulse which starts the feedback circuit (26) and the driving circuit (28) into oscillation. The resonant circuit (24) is connected to the drive node (20) and has a resonant node (32) for providing output power to the electronic lamp (40). The feedback circuit (26) is connected to the resonant node (32) of the resonant circuit (24) and provides oscillatory feedback to the driving circuit (28) so as to cause the driving circuit (28) to oscillate after providing the initial output power pulse. The driving circuit (28) is connected to the output terminals (14, 16) of the rectifier circuit (10) and responds to the starting pulse by providing the initial output power pulse to the drive node (20), and responds to the oscillatory feedback by oscillating and providing output power to the drive node (20). The output coupling circuit (30) is connected to the feedback circuit (26), the output terminals (14, 16) of the rectifier means (10), and the electronic lamp (40), for coupling the output power to the electronic lamp (40).

1 Claim, 3 Drawing Sheets

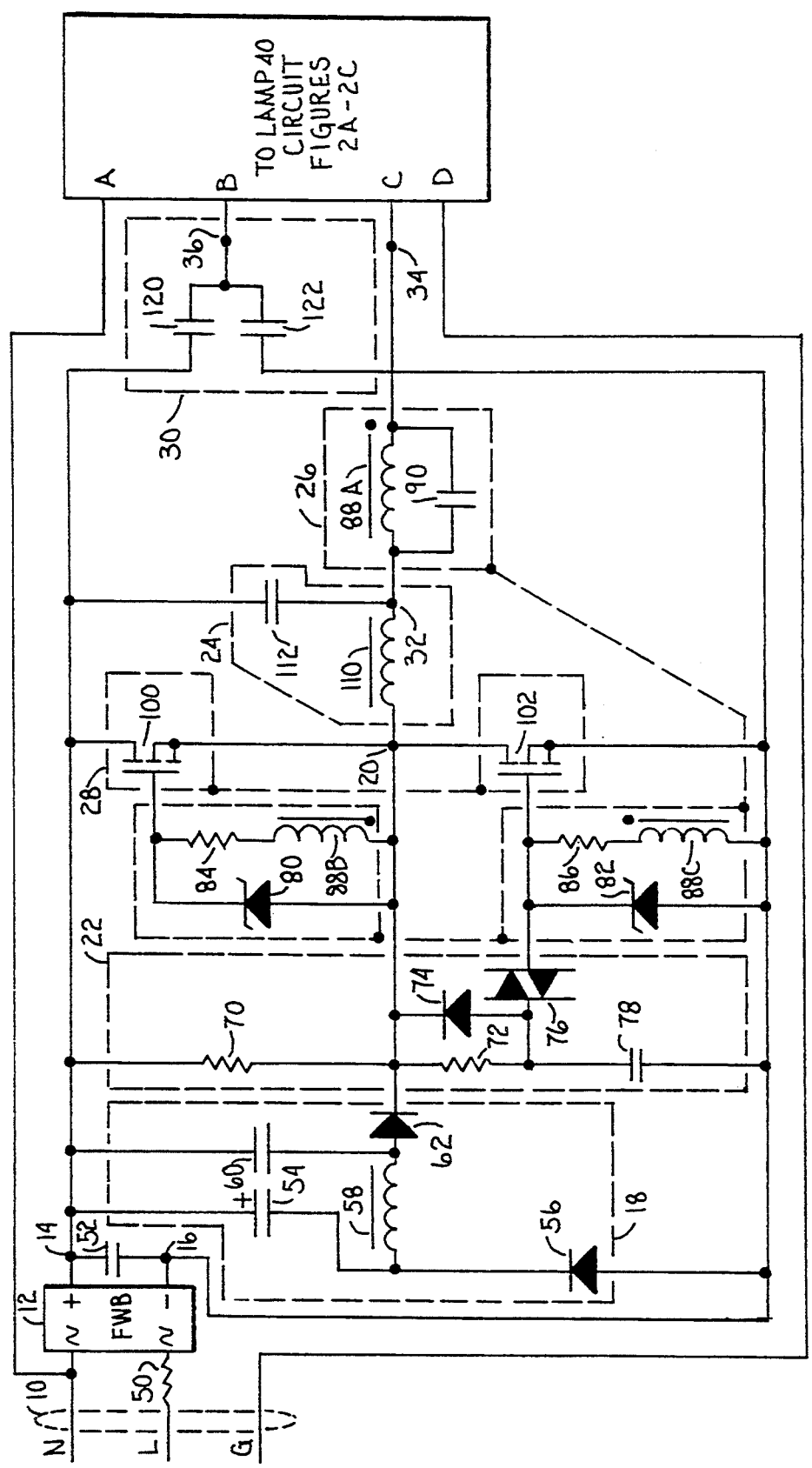
Fig — 1

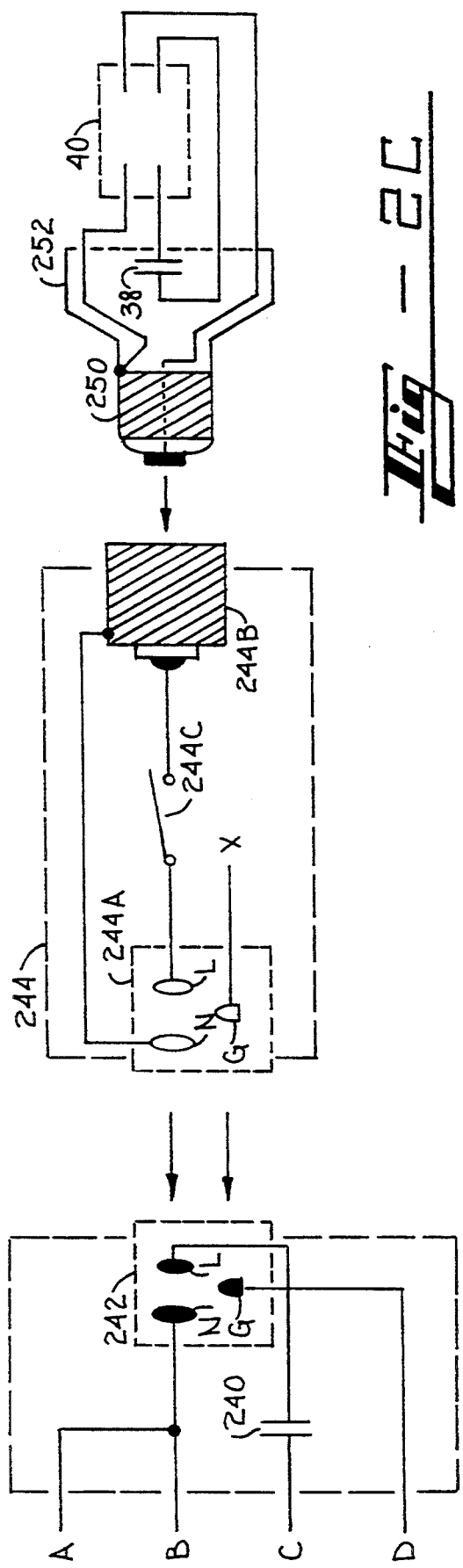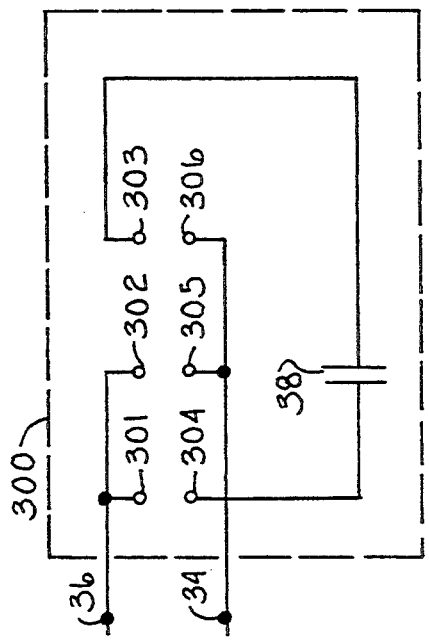
Fig-2C
Fig-3

HIGH EFFICIENCY BALLAST FOR OPERATION OF ELECTRONIC LAMPS

TECHNICAL FIELD

The present invention relates to electronic lamps and, more particularly, to a high efficiency ballast for operation of electronic lamps.

BACKGROUND OF THE INVENTION

Incandescent lamps are probably still the most common type of lamp in use. However, the high heat output and low efficiency disadvantages of incandescent lamps are well known. These disadvantages have caused the use of electronic lamps, such as fluorescent lamps and metal-vapor discharge lamps, to become more and more widespread.

However, electronic lamps have different disadvantages. A special circuit, generally referred to as a ballast, is required to start the lamps. One common ballast is simply a transformer. However, a ballast transformer is bulky and heavy and is generally suited for use only in places where size and weight is not particularly significant, for example, in ceiling mounted locations, such as in offices and in hanging "shop" lights.

Electronic lamps are not limited to use in ceiling mounted locations. It is highly desirable to use electronic lamps to replace incandescent lamps in many locations, such as conventional table, floor, and column lighting devices in the home. Considerable savings in energy costs can be achieved in commercial lodging facilities, such as hotels and motels, by replacing incandescent lighting devices with electronic lighting devices. In addition, considerable reduction in the overall use of energy can be achieved by such replacement in homes, commercial facilities, and offices.

However, ballast transformers are generally unsuited for use in conventional table, floor, and column lighting devices because of the size and weight of the transformer. In addition, ballast transformers represent an inductive load which adversely affects the power factor. Therefore, circuits have been designed for starting and operating electronic lamps. For example, see U.S. Pat. Nos. 4,277,728; 4,525,650; 4,544,863; 4,572,989; 4,585,974; 4,851,739; 4,972,124; 5,111,380; 5,138,235; 5,166,579; 5,179,326; 5,191,262; 5,214,355; 5,258,692; and 5,262,699; the teachings of all of which are hereby incorporated herein by reference.

In addition, some existing lighting fixtures, such as overhead ceiling panel lighting, may be conveniently modified to accommodate an improved ballast circuit. However, many lighting fixtures, such as table, floor and column lamps, cannot be so modified, for reasons such as the person-hour costs involved in the modification, size constraints, and appearance. Therefore, there is a need for a ballast for electronic lamps which can be used to retrofit existing light fixtures for use with electronic lamps without requiring modification of the existing light fixture.

In addition, there is a need for a ballast circuit for electronic lamps which provides for starting and operating both fluorescent lamps and metal-vapor discharge lamps, without the need for any changes in the circuit.

Further, there is a need for a ballast circuit for electronic lamps which provides for high efficiency and a high power factor.

SUMMARY OF THE INVENTION

The present invention provides a method and an apparatus for operation of electronic lamps, such as fluorescent lamps and metal-vapor discharge lamps.

In addition, the present invention provides for high efficiency operation and for operation with a high power factor.

The present invention provides a ballast apparatus for operating an electronic lamp from an AC line. The ballast comprises a rectifier circuit, a power coupling circuit, a starting circuit, a resonant circuit, a feedback circuit, a driving circuit, and an output coupling circuit. The rectifier circuit is connected to the AC line and has a first output terminal and a second output terminal for providing DC operating power. The power coupling circuit is connected to the DC operating power and provides power to a drive node. The starting circuit provides a starting pulse which starts the feedback circuit and the driving circuit into oscillation. The resonant circuit is connected to the drive node and has a resonant node for providing output power to the electronic lamp. The feedback circuit is connected to the resonant node of the resonant circuit and provides oscillatory feedback to the driving circuit so as to cause the driving circuit to oscillate after providing the initial output power pulse. The driving circuit is connected to the output terminals of the rectifier circuit and responds to the starting pulse by providing the initial output power pulse to the drive node, and responds to the oscillatory feedback by oscillating and providing output power to the drive node. The output coupling circuit is connected to the feedback circuit, the output terminals of the rectifier means, and the electronic lamp, for coupling the output power to the electronic lamp. The socket of the present invention provides the appropriate wiring connection, automatically, for both fluorescent and metal-vapor lamps.

In one embodiment the present invention has a lamp lit sensing circuit, and two electronic lamps. If the first electronic lamp is lit then the sensing circuitry disconnects the second electronic lamp. However, if the first electronic lamp does not light then the sensing circuitry connects the second electronic lamp. In this way, the second electronic lamp is held in reserve for use in the event that the first electronic lamp fails. This feature is particularly useful in lighting environments where it is essential that lighting be provided at all times, such as an emergency exit sign.

In another embodiment of the present invention an adapter is provided for retrofitting existing light fixtures for use with electronic lamps. A first adapter is provided between the AC wall outlet and the existing light fixture. The first adapter plugs into the AC wall outlet and the light fixture plugs into the first adapter. A second, screw-in adapter, is provided which screws into the light fixture socket in the same manner as an incandescent bulb would normally screw into the light fixture socket. The second adapter provides a second socket into which an electronic lamp may be inserted, and is appropriate for both fluorescent and metal-vapor electronic lamps.

In addition, the present invention provides for a high efficiency circuit so that the ballast circuit may be installed in an adapter which screws into the socket of an existing lighting fixture. The electronic lamp then plugs into the adapter. Therefore, retrofitting of existing light fixtures may be achieved without modification of the light fixtures.

It will therefore be seen that the present invention is a ballast circuit which provides for high efficiency operation of electronic lamps. In addition, the present invention provides for dual lamp operation, with automatic switching between the lamps, for emergency lighting. Further, the present invention provides for convenient retrofitting of existing light fixtures to operate with electronic lamps.

BRIEF DESCRIPTION OF THE DRAWINGS

FIG. 1 is a schematic diagram of the present invention.

FIGS. 2A–2C illustrate different types of wiring connections.

FIG. 3 is an illustration of the wiring connection for the socket into which an electronic lamp is inserted.

DETAIL DESCRIPTION

Figure 2A:
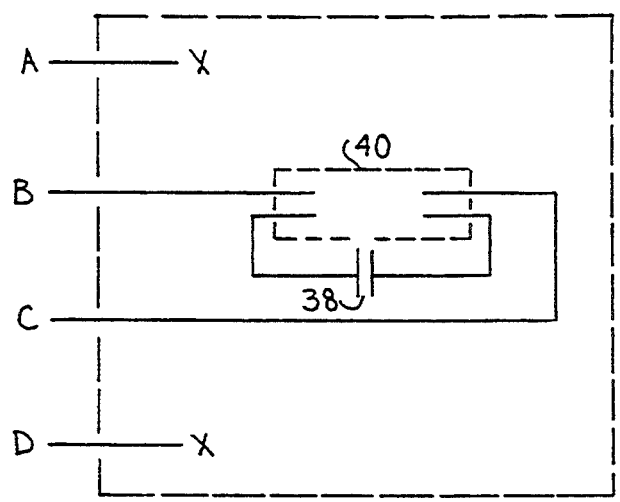

Turn now to the drawing in which like numerals represent like components throughout the several figures. FIG. 1 is a schematic diagram of the present invention. The present invention provides a ballast apparatus for operating an electronic lamp from an AC line 10 and has a rectifier circuit 12, a power coupling circuit 18, a starting circuit 22, a resonant circuit 24, a feedback circuit 26, a driving circuit 28, and an output coupling circuit 30. The rectifier circuit 12 is connected to the AC line 10 and has a positive output terminal 14 and a negative output terminal 16 for providing DC operating power. The power coupling circuit 18 is connected to the DC operating power terminals 14, 16 and provides power to a drive node 20. The starting circuit 22 provides a starting pulse which starts the feedback circuit 26 and the driving circuit 28 into oscillation. The resonant circuit 24 is connected to the drive node 20 and has a resonant node 32 for providing output power to the electronic lamp 40. The feedback circuit 26 is connected to the resonant node 32 of the resonant circuit 24 and to a first output drive node 34, and provides oscillatory feedback to the driving circuit 28 so as to cause the driving circuit 28 to oscillate after providing the initial output power pulse. The driving circuit 28 is connected to the output terminals 14, 16 of the rectifier circuit 10 and responds to the starting pulse from the starting circuit 22 by providing the initial output power pulse to the drive node 20, and responds to the oscillatory feedback by oscillating and providing output power to the drive node 20. The output coupling circuit 30 provides first and second output drive nodes 34 and 36, respectively. The coupling circuit 30 is connected to the feedback circuit 26, the output terminals 14, 16 of the rectifier means 10, and the electronic lamp 40, for coupling the output power to the electronic lamp 40.

Rectifier circuit 12 is a full wave bridge rectifier and is connected to the AC line 10 via a current limiting fusible resistor 50. Resistor 50 is a safety device and is not involved with the operation of the present invention. A noise suppression capacitor 52 is connected between terminals 14 and 16.

The starting circuit 22 is conventional in design and operation. Briefly stated, capacitor 78 charges through resistor 72. When the voltage across capacitor 78 has reached the breakdown voltage of DIAC 76, DIAC 76 conducts, thereby turning on transistor 102. When transistor 102 turns on it discharges capacitor 78 through diode 74 so, whenever transistor 102 is turned on, capacitor 78 is discharged. The frequency of oscillation of the resonant circuit 24 of the present invention is significantly higher than the charge rate of capacitor 78. Therefore, once oscillation has started, capacitor 78 does not charge to the breakdown voltage of DIAC 76. It will therefore be seen that the starting circuit 22 provides an initial pulse to start oscillation and thereafter plays no role as long as oscillation is maintained. If oscillation does not start, or is not sustained, starting circuit 22 becomes active again. The starting circuit 22 also has a resistor 70 connected between the positive terminal 14 and the drive node 20. This is make sure that capacitor 78 receives a charging current for starting the circuit even if there is a charge, in the other circuits, from previous operation, which has not been discharged, and thereby prevents the other circuits from providing charging current to capacitor 78.

The driving circuit 28 comprises two n-channel enhancement-type MOSFET transistors 100, 102 connected in series between DC power terminals 14 and 16. The junction of these transistors 100, 102 is connected to the drive node 20. The resonant circuit 24 is also connected to the drive node 20 and is a series resonant circuit comprising an inductor 110 and a capacitor 112. The junction of inductor 100 and capacitor 112 is at resonant node 32. The feedback circuit 26 is connected between the resonant node 32 and the first output drive node 34. Outputs of the feedback circuit are connected to drive transistors 100, 102. The feedback circuit 26 consists of a transformer 88 having a single primary winding 88A and two secondary windings 88B, 88C. Winding 88B is connected through a current limiting resistor 84 to the gate of transistor 100. Likewise, winding 88C is connected through a current limiting resistor 86 to the gate of transistor 102. The polarity of the windings is selected so as to provide positive feedback to transistors 100 and 102 and thereby maintain oscillation. A capacitor 90 is connected across primary winding 88A so as to shunt higher frequency noise transients around transformer 88. This prevents noise from adversely affecting the oscillation. Zener diodes 80, 82 are connected to the gates and sources of transistors 100, 102, respectively, so as to prevent excessive feedback voltage from damaging transistors 100, 102.

The output coupling circuit 30 further comprises capacitors 120 and 122, which are connected in series between DC power terminals 14 and 16. The junction of capacitors 120 and 122 is connected to the second output drive node 36. The electronic lamps are driven via output drive nodes 34 and 36.

Figure 2B:
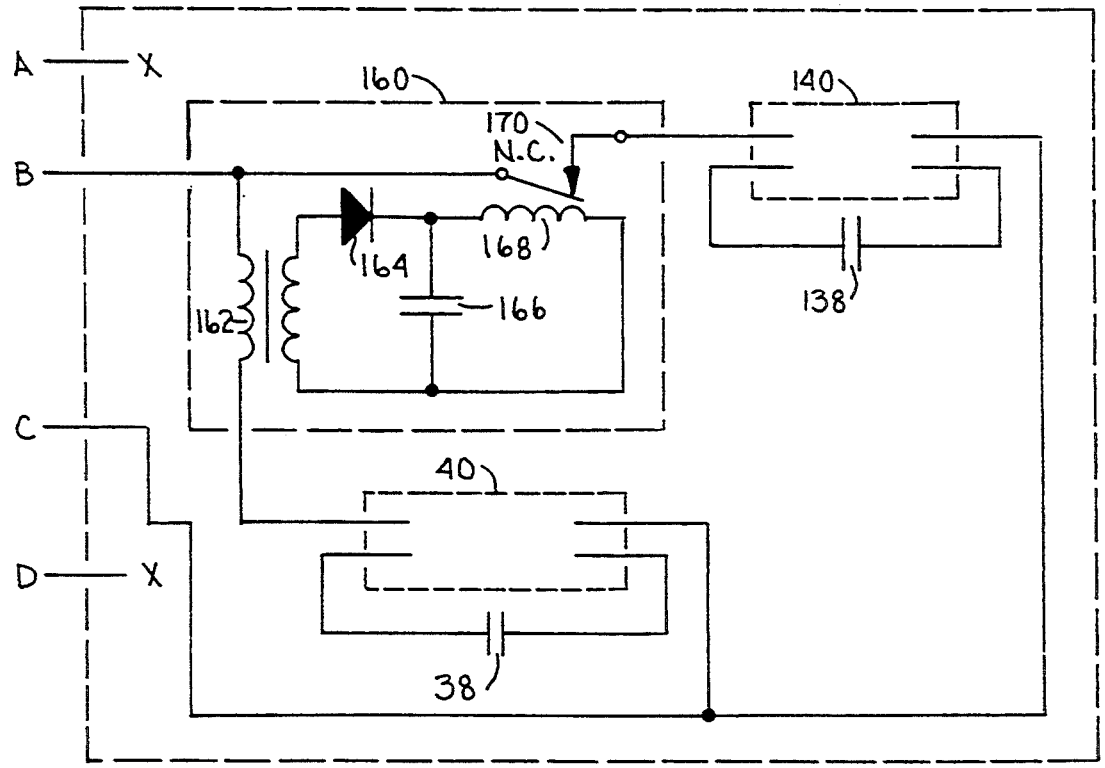

FIGS. 2A–2C illustrate different types of wiring connections. The present invention contemplates a plurality of different operating environments, and slightly different circuits are preferred to accommodate each environment. Examples of different environments are, by way of illustration and not of limitation, an overhead light fixture, an exit sign, and an in-line adapter to a conventional fight fixture which is to be retrofitted from an incandescent lamp to an electronic lamp. FIG. 2A is the circuit for an overhead light fixture or other light fixture which can be conveniently modified. The lamp 40 is connected between output drive nodes 34 and 36. Consider the operation of the circuit described so far. The starting circuit 22 provides a starting pulse to transistor 102, which causes resonant circuit 24 to oscillate. The high voltage across capacitor 112 caused by the series resonance is applied to the lamp 40, thereby causing the lamp 40 to "ignite" or fight. This causes a current flow through transformer 88, thereby generating feedback for transistors 100 and 102. Therefore, oscillation is maintained and the lamp 40 stays lit. However, in conventional circuits, capacitor 52 must be large to prevent flickering because the output of rectifier 12 is pulsed DC. This means that a large current is drawn from the AC line 10 to charge capacitor 52 during the peak of the AC voltage.

Consider now the benefit provided by the power coupling circuit 18 of the present invention. The power coupling circuit 18 comprises capacitors 54 and 60, diodes 56 and 62, and an inductor 58. The positive terminal of capacitor 54 is connected to positive terminal 14. The negative terminal of capacitor 54 is connected to the cathode of diode 56. The anode of diode 56 is connected to negative terminal 16. The junction of capacitor 54 and diode 56 is connected to one end of inductor 58. The other end of inductor 58 is connected to one end of capacitor 60 and to the anode of diode 62. The other end of capacitor 60 is connected to the positive terminal 14. The cathode of diode 62 is connected to the drive node 20. When the voltage of AC line 10 is high and transistor 102 is turned on, by starting circuit 22 or by feedback circuit 26, current flows from positive terminal 14 through capacitor 54, inductor 58, capacitor 60, and diode 62 through transistor 102 to negative terminal 16. Current also flows from terminal 14 through the resonant circuit 24 and transistor 102 to negative terminal 16. Further current flows from terminal 14 through capacitor 120, output node 36, lamp 40 and capacitor 38, output node 34, feedback circuit 26, and transistor 102 to negative terminal 16. Finally, any charge across capacitor 122 is discharged through output node 36, lamp 40 and capacitor 38, output node 34, feedback circuit 26, and transistor 102.

As long as the current through lamp 40, and therefore feedback circuit 26, is of a first polarity and is increasing, positive feedback will be provided to transistor 102. However, once this current begins to decrease or the polarity reverses, transistor 102 will be turned off and transistor 100 will be turned on. Now, transistor 100 will act to connect together terminal 14 and drive node 20. The current stored in capacitor 54, and the inductive energy stored in inductor 58, will flow through resonant circuit 24 and lamp 40, and through capacitor 120, and then through capacitor 122 and diode 56 back to capacitor 54 and inductor 58. Note that diodes 56 and 62 only allow the current from inductor 58 to flow toward drive node 20, and only allow the return current via diode 56. As long as the current through lamp 40 is of the reverse (second) polarity and is increasing, transistor 100 will remain turned on due to the drive provided by feedback circuit 26. Once this current begins to decrease or the polarity returns to the first polarity, transistor 100 will be turned off and transistor 102 will be turned on, thereby repeating the oscillatory cycle.

If the AC line 10 voltage is not high (less than the voltage across capacitor 54) then, when transistor 102 is turned on, capacitor 54 will not be charged by AC line 10. However, transistor 102 and diode 56 will allow inductor 58 to maintain its current flow, so as to prevent any inductive voltage spikes. Also, capacitor 54 will operate as the power supply for lamp 40 and, in this case, current will flow from capacitor 54, through coupling circuit 30, lamp 40, feedback circuit 26, inductor 110, transistor 102, and finally through diode 56 back into capacitor 54.

It will be appreciated that inductor 58 serves two functions: (1) to store energy as inductive energy for operation of the lamp 40 when transistor 100 is turned on; and (2) to prevent large charging currents through capacitor 54 when the pulsed DC voltage on terminal 14 exceeds the voltage across capacitor 54. The power coupling circuit of the present invention therefore prevents large peak currents, and provides for storage of operating power for the lamp so as to prevent flickering of the lamp. Using the present invention, power factors of 0.95 to 0.97 have been obtained.

FIG. 2B is the circuit for operation where a primary lamp and a backup lamp are desired, such as in an emergency or exit sign. Output node 36 is connected through a lamp-fit sensing circuit 160 to lamps 40 and 140. Lamps 40 and 140 are then connected to output node 34. When current is flowing though lamp 40, circuit 160 will disconnect lamp 140 from node 36. Therefore, lamp 40 will be lit and lamp 140 will not be powered. If lamp 40 fails, then circuit 160 will connect lamp 140 to node 36, and lamp 140 will be lit. If lamp 40 subsequently relights, circuit 160 will then disconnect lamp 140. In this manner lamp 140 is used only when necessary. The current drawn by capacitor 38 is insufficient to power coil 168.

Circuit 160 comprises a transformer 162, a rectifier diode 164, a filter capacitor 166, a coil 168, and a normally closed magnetic switch 170, such as a reed switch upon which coil 168 is wound. Diode 164 and capacitor 166 form a filtered, half-wave rectified power supply to drive coil 168. If lamp 40 is fit, then lamp 40 will draw current through the primary of transformer 162. The secondary of transformer 162 will then provide operating power to diode 164 and capacitor 166, which will energize coil 168, will which cause switch 170 to open, thereby disconnecting lamp 140 from node 36. If lamp 40 is not lit, then there will be little or no current through the primary of transformer 162, coil 168 will not be energized, and switch 170 will close, thereby connecting lamp 140 to node 36. It will be appreciated that circuit operation is automatic and, because lamp 40 only draws current when fit, circuit 160 faithfully responds to whether lamp 40 is lit or not.

FIG. 2C is the circuit for retrofitting an existing light fixture without actually modifying the fight fixture. It is desirable to be able to use electronic lamps in place of incandescent lamps in existing light fixtures. However, it is also desirable not to modify the existing light fixtures. The present invention also accommodates this need. A first adapter circuit, containing the ballast circuit of the present invention, is used to change the standard AC line voltage to the voltage needed for operation of the electronic lamps. The existing fight fixture then plugs into this adapter. A second adapter is screwed into the receptacle for the incandescent bulb in the existing light fixture. The electronic lamp is then plugged into this second adapter. There are no modifications required to the existing light fixture so restoration is very easy and efficient.

In this case, for safety reasons, the neutral N of the AC line 10 is connected to output node 36. The neutral line N and output node 36 are then connected to the neutral N terminal of socket 242. Output node 34 is connected through capacitor 240 to the line L terminal of socket 242. Lastly, an optional ground wire G is connected to the ground G terminal of socket 242.

The existing light fixture 244, which is to be retrofitted, is conventional. For example, the existing light fixture 244 has a plug 244A, a socket or receptacle 244B into which an incandescent bulb is normally screwed in, and typically also, but not necessarily, has a on/off switch 244C. The neutral N terminal of plug 244A is connected to the shell of socket 244B, and the line L terminal of plug 244A is connected through switch 244C to the center contact of socket 244B. Existing light fixture 244 may or may not have or use a ground G terminal in plug 244A.

The second adapter 252 has a screw-in base 250, which is designed to screw into socket 244B of light fixture 244. This second adapter 252 also has a socket 300 into which lamp 40 is inserted.

FIG. 3 is an illustration of the wiring connection for the socket 300 into which an electronic lamp is inserted. In the preferred embodiment, socket 300 is designed to accommodate both fluorescent and metal-vapor lamps. Therefore, six terminals are provided, three terminals in each of two rows. The spacing will, of course, be dependent upon the wattage rating of the lamp used. Output node 36 is connected to terminals 301 and 302. Terminal 303 is connected to terminal 304 through capacitor 38. Lastly, terminals 305 and 306 are connected to output node 34. If a fluorescent lamp is inserted, then terminals 301, 303, 304, and 306 will be used, and capacitor 38 will be connected in series with the filaments of the lamp 40 until lamp 40 is lit, and then capacitor 38 will be in parallel with the lamp 40. Terminals 302 and 305 will not be used. However, if a metal vapor lamp is inserted, then terminals 302 and 305 will be used, but terminals 301, 303, 304, and 306, and capacitor 38 will not be used. This socket therefore automatically configures the electronic ballast circuit for operation with the selected electronic lamp type.

If the existing light fixture 244 has sufficient space, the circuit of FIGS. 1 and 2A may be installed in the adapter socket 250 of FIG. 2C. In this case, plug 244A plugs directly into the AC outlet, without any intervening adapter. Then, the shell of base 250 is connected to line N of FIG. 1, and the center contact of base 250 is connected to line L of FIG. 1. Line G and output connections A and D of FIG. 1 are not used. Output lines B and C of FIG. 1 then connect to lamp 40 as shown in FIGS. 2A and 3. This is made possible because of the high efficiency and low heat generation of the circuit of FIG. 1.

| COMPONENT VALUES | |
|---|---|
| Component | Value |
| Full Wave Bridge 12 | 1000 V, 1 Amp |
| Capacitors 38, 138 | 2200 to 7500 pF |
| Capacitor 52 | 0.1 µF |
| Capacitor 54 | 22 µF |
| Diodes 56, 62, 74, 164 | 1 KV, 1 Amp |
| Inductor 58 | 35 mH |
| Capacitor 60 | 1000 to 1500 pF |
| Resistor 70 | 200 Kohms |
| Resistor 72 | 820 Kohms |
| DIAC 76 | 35 Volts |
| Capacitor 78 | 0.047 µF |
| Zeners 80, 82 | 12 to 20 V |
| Resistors 84, 86 | 68 to 200 ohms |

-continued

| COMPONENT VALUES | |
|---|---|
| Component | Value |
| Transformer 88 | 10:1 turns ratio (0.23 mH to 0.02 mH) |
| Transistors 100, 102 | IRF840 |
| Inductor 110 | 0.5 to 0.533 mH |
| Capacitor 112 | 2200 to 7500 pF |
| Capacitors 120, 122, 240 | 0.047 µF |
| Transformer 162 | 9.5:11.5 turns ratio |
| Capacitor 166 | 0.1 µF |

It will be appreciated that the present invention provides an electronic ballast for operation of electronic bulbs and provides for high efficiency and a high power factor. The present invention also provides for retrofitting of existing lamps, without modification of the existing lamps.

Component values are not critical, but are given in the Table for convenience. Also, some components are not critical, and may be eliminated. For example, capacitors 60 and 90 have been eliminated in one version of the circuit. Also, capacitor 122 has been eliminated in another version of the circuit.

From the above description, other embodiments and uses for the present invention will suggest themselves to those of skill in the art. Therefore, the scope of the present invention is to be limited only by the claims below.

I claim:

1. A ballast apparatus for operating an electronic lamp from an AC fine, comprising:
    a rectifier circuit, connected to said AC line, and having a first output terminal and a second output terminal for providing DC power;
    a capacitor having a first end connected to said first output terminal and a second end connected to a junction;
    a diode, having a first end connected to said junction and a second end connected to said second output terminal;
    an inductor;
    a diode;
    said inductor and said diode being connected in series, and being connected between said junction and a drive node;
    a starting circuit for providing a starting pulse;
    a resonant circuit, connected to said drive node, and having a resonant node for providing output power;
    a feedback circuit, connected to said resonant node, for providing oscillatory feedback to said driving circuit so as to cause said driving circuit to oscillate;
    a driving circuit connected to said output terminals of said rectifier circuit, and responsive to said starting pulse for providing an initial output power pulse to said drive node, and responsive to said oscillatory feedback for oscillating and providing said output power to said drive node; and
    an output coupling circuit, connected to said feedback circuit, said output terminals of said rectifier means, and said electronic lamp, for coupling said output power to said electronic lamp.

* * * * *